Aug. 21, 1956  R. O. BRADLEY  2,759,603
DYNAMIC CLASSIFIER WITH GATE SELECTING DEVICE
Filed Feb. 18, 1953  4 Sheets-Sheet 1
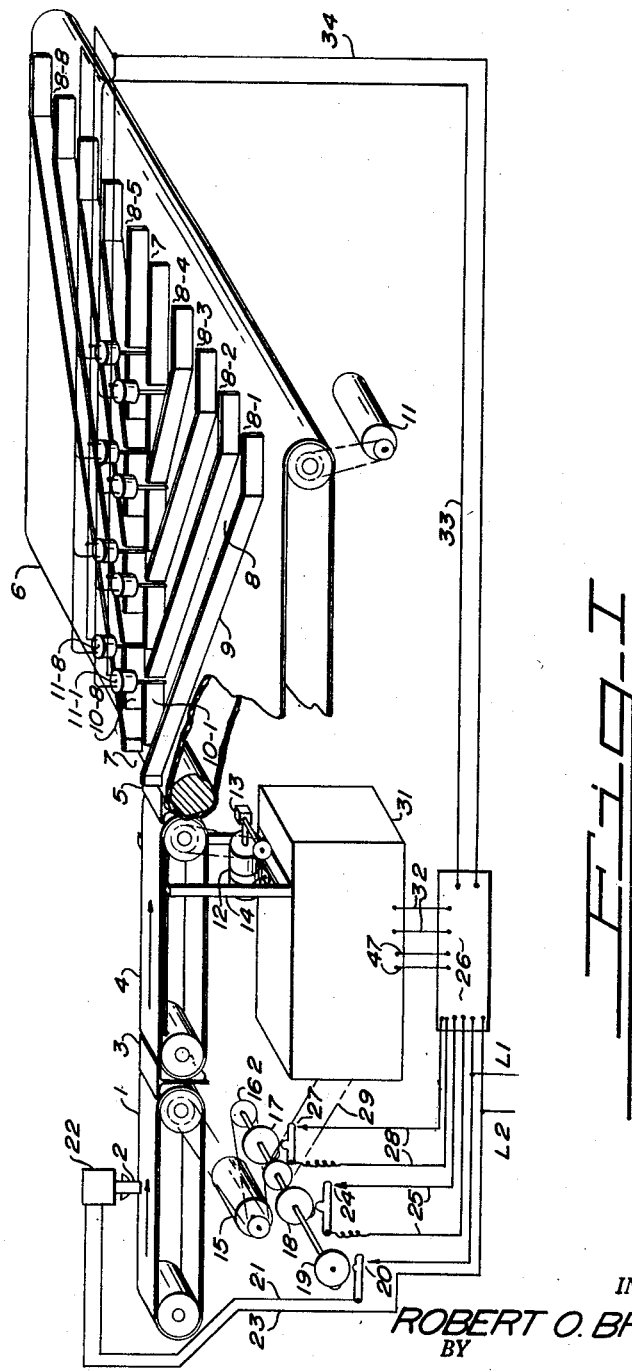
INVENTOR.
ROBERT O. BRADLEY
BY
Marshall, Marshall & Trostin
ATTORNEYS

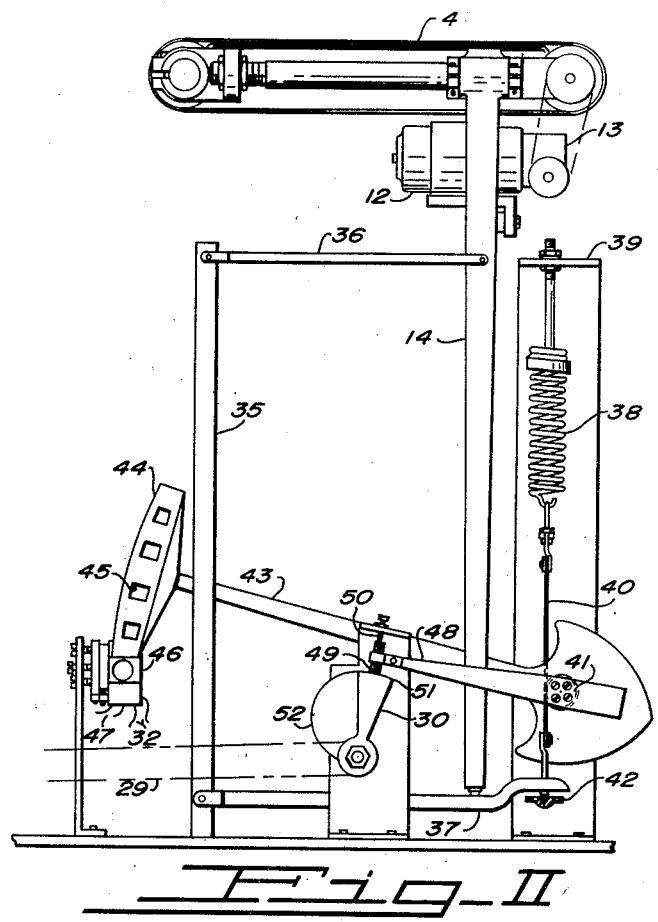

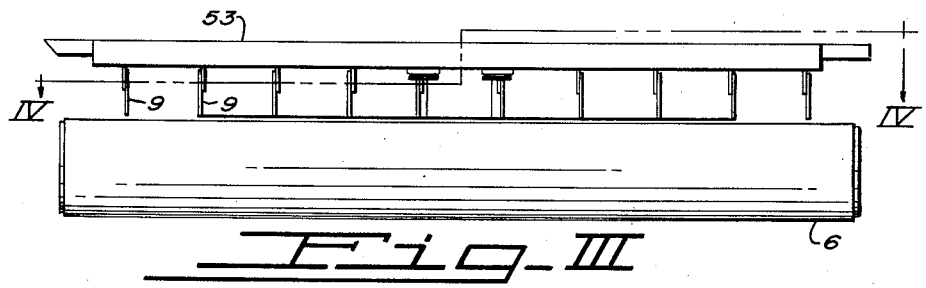
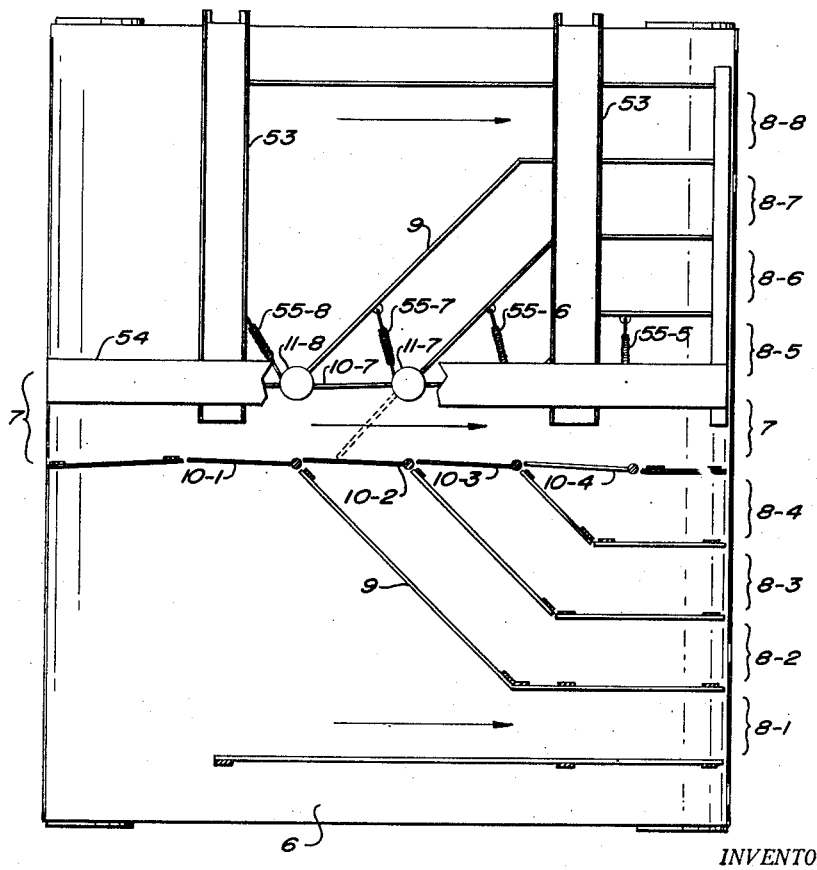

Aug. 21, 1956  R. O. BRADLEY  2,759,603
DYNAMIC CLASSIFIER WITH GATE SELECTING DEVICE
Filed Feb. 18, 1953  4 Sheets-Sheet 4
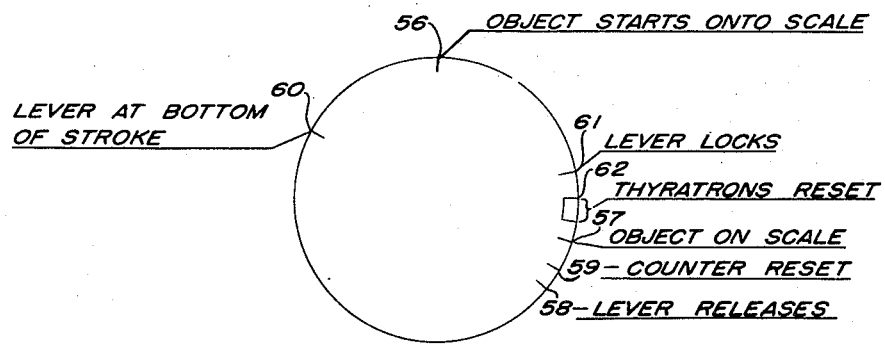
Fig. V
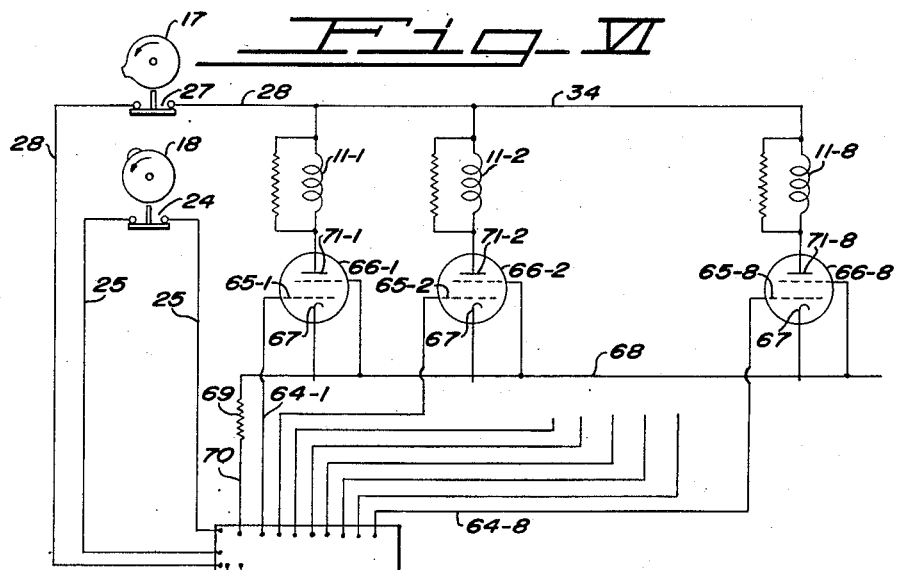
Fig. VI
INVENTOR.
ROBERT O. BRADLEY
BY
Marshall, Marshall and Yeasting
ATTORNEYS

United States Patent Office 2,759,603
Patented Aug. 21, 1956

2,759,603

DYNAMIC CLASSIFIER WITH GATE SELECTING DEVICE

Robert O. Bradley, Toledo, Ohio, assignor to Toledo Scale Company, Toledo, Ohio, a corporation of New Jersey Application February 18, 1953, Serial No. 337,584

6 Claims. (Cl. 209—121)

This invention relates to weighing and classifying devices and in particular to a combination of a high speed weighing scale and combination of sorting gates that are actuated in accordance with the deviation in weight of a piece being weighed from the standard weight for such pieces.

To simplify the ever increasing demand for completely interchangeable parts it is necessary in many industries to supply parts that are not only accurate in dimension but are also accurate in weight. When the parts are used in high speed rotating machinery the allowable tolerance in weight is extremely small. As these parts are often made in large quantities it is therefore necessary that classifying equipment must not only operate accurately but also very rapidly.

The principal object of this invention is to provide a classifying scale that combines high accuracy of weighing with high speed of operation.

Another object of this invention is to provide a high speed classifying device in which the articles being classified move across the scale and are accurately weighed while in motion.

A still further object of this invention is to provide a reliable sorting device to operate in combination with the scale to separate the objects into groups according to their weights.

A still further object of this invention is to provide a timed interlocking between the advance of objects on an approach conveyor and the operation of the weighing scale such that there is no starting or stopping of the object on the scale to disturb the accuracy of the scale.

A still further object is to provide a classifying scale in which the loading and unloading portion of the cycle may overlap the last part of the weighing part of the cycle.

More specific objects and advantages are apparent from the following description of the improved classifying device.

According to the invention the improved classifying device includes a constant speed approach conveyor, a constant speed conveyor mounted on a weighing scale, and a take-away conveyor operated at higher speed and passing beneath a selecting device comprising a plurality of lanes branching off from a central lane extending parallel to the travel of the take away conveyor. The weighing scale is of the dynamic or single swing type in which the weighing mechanism is locked until an object is completely on the scale and is then released and allowed to execute one cycle of oscillation, the full travel of which is proportional to the load on the scale. The maximum swing of the lever, its double amplitude as measured from its locked position, is electrically recorded and selecting gates in the selecting device are actuated accordingly. The mechanism is ordinarily operated at speeds considerably greater than one weighing per second thus allowing the classifying of thirty-five hundred to six or seven thousands pieces per hour. At these speeds of operation the uncertainty between weight classifications, that range of weight in which the scale may direct the object into either of adjacent weight classifications, is ordinarily less than 1/10 of one per cent of the weight of the object being classified.

A preferred form of the invention is illustrated in the accompanying drawings.

In the drawings:

Figure I is a schematic view, in perspective, showing the general organization of the approach, scale, and take-away conveyors; the timing mechanism; and the selecting mechanism.

Figure II is a side elevation of the weighing scale with its cover removed to illustrate the mechanism of the scale.

Figure III is an end elevation of the discharge end of the take away conveyor and selecting mechanism.

Figure IV is a plan view, parts being shown as horizontal sections, according to lines IV—IV of Figure III showing the selecting gate mechanism.

Figure V is a timing diagram illustrating the timing between the various portions of the mechanism as is required to secure continuous operation of most of the equipment.

Figure VI is a schematic wiring diagram illustrating the electrical controls for the sorting gates.

These specific figures and the accompanying description are intended merely to illustrate the invention but not to impose limitations on its scope.

The improved weight classifying device includes an approach conveyor 1 on which the objects are received and held by a latch or catch 2 that is periodically operated to allow the objects to travel along the conveyor 1, across a bridge plate 3, and onto a weighing scale conveyor 4. While the objects are traveling along this conveyor 4 they are weighed and then are discharged across a second slide plate 5 onto a take away conveyor 6. The take-away conveyor 6 operates at a higher speed than do the approach and scale conveyors in order that an object may be carried completely through the selecting system before the weighing operation for the succeeding article is completed.

As an article moves onto the take-away conveyor 6 it first enters a central lane 7 and then is laterally deflected into a selected one of a plurality of lanes 8–1 to 8–8. The lanes are formed by fences 9 depending from an overhead frame and arranged to form generally parallel paths diverging from the central lane 7. A plurality of gates 10–1 to 10–8 are arranged at the leading end of each of the fences 9 adjacent the central lane 7 in such a manner that they may be rotated by rotary solenoids 11–1 to 11–8 to a position in which they obstruct the central lane 7 and divert the object into the corresponding selecting lane 8. Since the objects are resting on the wide, moving, take-away conveyor 6 they slide sidewise on the conveyor to follow the diverging paths.

The timing is adjusted so that as a weighing is completed the solenoid corresponding to the weight is immediately energized and is held energized until the completion of the next weighing. At that time the previously weighed article will have been carried past the last of the selecting gates. It is thus unnecessary to store or remember a previous weight indication after the next weighing is completed.

The take-away conveyor 6 is preferably driven by a motor 11 since it is unnecessary that it operate in exact synchronism with the other conveyors and since it must operate at a considerably higher speed.

The scale conveyor 4 is driven by a small synchronous motor 12 equipped with a gear reduction unit 13 the whole assembly being mounted on a spider 14 of the scale. The approach conveyor 1 is driven by a motor 15 that also drives a cam shaft 16. The speed of the motor 15 is selected so that the surface speeds of the approach conveyor 1 and scale conveyor 4 are substantially equal.

In order that the feeding, weighing, and selecting operations may be properly synchronized these operations are all timed from mechanism driven by the motor 15.

The shaft 16 carries a plurality of cams 17, 18 and 19 the last of which operates a switch 20 that is included in a circuit that may be traced from a power lead L1 through the switch 20, a lead 21, a solenoid 22 of the latch 2 and a return lead 23 that is connected to a return power lead L2. This circuit provides for the timed periodic release of articles carried on the approach conveyor 1. The second cam 18 operates a second switch 24 that, by leads 25, is connected to an electronic counter 26. This counter may be substantially the same as the electronic counter and matrix illustrated in Figs. 2 or 3 of United States Patent No. 2,591,007 to Rench. The switch 24, corresponding to switches 267 or 410 in the Rench patent, is arranged to reset the counter to zero at the start of each weighing. The remaining cam 17 operates a switch 27 that is connected through leads 28 to the counter 26. This switch serves to momentarily de-energize the circuit to the rotary solenoids 11-1 to 11-8 to permit a new weight selection to be set up in the selecting gates. The cam shaft 16 is also connected through a chain drive 29 to operate a weighing scale catch in the form of a locking cam 30 shown in Figure II.

Weighing mechainsm enclosed within a case 31 and including the spider 14 is arranged to deliver, through leads 32, a series of electrical impulses equal in number to the weight deviation of the particular article then being weighed. These electrical impulses are counted and, according to the number of counts, a selected lead in a cable 33 is, in effect, grounded to supply power to the corresponding one of the gate operating solenoids 11-1 to 11-8. The other side of each of the solenoids is connected to a power lead 34.

The weighing scale is illustrated in greater detail in Figure II. As shown in this figure the scale comprises an upright standard 35 to which a check link 36 and a lever 37 are pivotally connected. The check link 36 and lever 37 support the spider 14 and the scale conveyor 4 with its drive motor 12 mounted on the spider. The force of gravity acting on the conveyor 4 including the load on the conveyor is counterbalanced by a weighing spring 38 the upper end of which is adjustably mounted in the upper end of a standard 39 and the lower end of which is connected through a flexible ribbon 40 to the end of the lever 37. The ribbon 40 passes around a drum 41 mounted on an indicator shaft. To prevent any slippage the flexible ribbon 40 is preferably divided into two parts each of which is attached to and wrapped part way around the drum 41 with one end extending upwardly to the spring 38 and the other extending downwardly to the stirrup 42.

An indicator arm 43 is mounted on the rotatable drum 41 and at its free end carries a chart 44 provided with a plurality of perforations 45. There are half as many perforations as there are zones or lanes into which the articles are to be directed. The perforated chart 44 serves as a shutter for a photoelectric device 46 arranged to deliver electrical impulses through its output leads 32 connected to the counter 26. The photoelectric device also includes a light source that is energized through leads 47.

A locking arm 48 also attached to the rotatable drum 41 carries an adjustable follower 49 that rides on a constant radius portion of the cam 30. The follower 49 is held in close contact with the cam 30 by a stop screw 50.

The rotation of the cam 30 driven by the chain drive 29 is timed according to the progress of an article along the conveyors 1 and 4 so that as soon as the article is completely on the scale 4 the follower 49 drops off a traling corner 51 of the cam 30. This releases or unlocks the weighing scale so that the locking arm 48 and indicator arm 43 may swing downwardly thus stretching the spring 38 through a distance that is proportional to the excess of the load on the scale over a predetermined minimum load that is less than the weight of any of the articles to be weighed. The travel of the indicator is controlled by the counterbalancing spring 38. As the indicator arm 43 carries the perforated chart 44 downwardly an electrical impulse is generated in the photoelectric means 46 as each slot passes the photoelectric cell. Since the slots pass once on the way down and once again on the way back each slot that completely passes the photo cell is counted twice while that slot being viewed at the instant of reversal of the chart is counted once. Thus an odd number of counts is produced if the indicator chart 44 reverses with light shining through a slot while an even number of counts is produced if the chart reverses while the light is interrupted by the chart at the instant of reversal.

The cam 30 is provided with a curved leading edge 52 that is shaped to follow the follower 49 without quite touching it during the upward swing of a lever while weighing a maximum capacity load. As the lever approaches its upper limit of travel the cam 30 gently engages the follower 49 to hold the lever in position.

It should be noted that there is no dashpot or damping means employed in this scale and that the lever system is not allowed to come to rest of its own accord. Rather the weight indication is taken by observing the maximum swing of the lever which is twice as far as the lever would move were it fully damped.

The mechanical arrangement of the sorting mechanism is illustrated in Figures III and IV. As is shown therein, a pair of channel beams 53 extend transversely across the width of the take away conveyor 6 and provide support for the depending fences 9 forming the various lanes 8. These channel beams also carry longitudinally extending bars 54 on which the gate operating solenoids 11-1 to 11-8 are mounted. The gates 10-1 are each formed of resilient sheet metal and are carried on the shafts of the rotary solenoids 11-1 to 11-8. The gates are normally held in retracted position by coil springs 55-1 to 55-8. When current is supplied to operate a solenoid, such as the solenoid 11-7 of Figure IV, the solenoid swings its gate to an extended position in which it obstructs the central lane 7 and diverts any object coming down that lane into the corresponding side lane. These gates are of a length in relation to the width of the straight lane 7 such that when fully extended they form continuations of the side fences 9 with their outermost ends resting against the gate on the far side of the central lane 7. In this arrangement very little force is required to operate each gate and yet the gates are capable of diverting relatively heavy objects.

The timing of the various operations is illustrated by the diagram in Figure V. In the diagram time increases clockwise around the diagram and the latch 2 is timed such that an article reaches the scale at point 56. Approximately one quarter to one-third of the cycle later, at a point 57, the object is completely on the scale. After allowing a brief time for the vibrations to settle out the lever is released at a point 58 to start a weighing cycle. At a point 59 which may be reached just before or simultaneously with the lever release point 58 the electronic counter 26 is reset for the weighing about to start or just starting. The released lever swings through its ocillation with the down swing of the lever taking slightly less than half of the complete cycle and thus the maximum down travel is reached approximately at a point 60. As the lever starts up again the object may start off of the scale at any time after the point 60 has been passed. This preferably coincides with the time the next object starts onto the scale. During this time the lever is moving upward towards its initial rest position and the cam 30 locks the lever at a point 61. At this time the electronic counter 26 has counted the number of impulses, is in an electrical condition corresponding to the weight classification of the object, and is ready to transfer that indication to thyratrons controlling the gate operating mechanism. Accordingly an instant later, at point 62, the previous selection is erased and the next selection set up in the thyratrons. The thyratron selection once made is held regardless of changes in counter indication and until the next weighing is completed and the thyratrons are reset.

From the timing diagram it will be noted that the period of the scale, i. e. the time for the lever to swing from its locked position to the bottom of its stroke and back to the top again may occupy as much as ninety per cent of a complete cycle of operation and that from one-fourth to one-third of the cycle time may be used to remove one object from the scale and place another on the scale. This overlap in the time of loading and weighing is allowable as long as loading of one piece and the unloading of the previous piece does not momentarily increase the load on the scale so as to cause a reversal of indicator travel during the upward swing of the indicator. This is direct contrast to the conditions that must be maintained during the time the lever is swinging down on the first half of its stroke when no disturbance can be tolerated. Actually the weighing is completed when the lever reverses, except for counting the impulses on the upward stroke. The load may change but the lever can do nothing but return to its locked position.

Referring now to Figure VI the gate solenoid operating circuits are shown separated from the remainder of the counter 26. It is to be understood that all of this circuit except the cams 17 and 18 with their switches 24 and 27 and the rotary solenoid coils 11-1 to 11-8 inclusive are included in the counter 26 in Figure I. The portion of the counter 26 indicated by the reference numeral 26a of Figure VI includes a conventional electronic counter equipped with a resolving matrix such that it may according to the count apply a positive potential to one and only one of a series of output leads 64-1 to 64-8 inclusive. These counter output leads are connected to control grids 65-1 to 65-8 respectively of a set of thyratron tubes 66-1, 66-2 to 66-8. To prevent the simultaneous operation of two or more tubes these thyratrons have their cathodes 67 interconnected by a common lead 68 that is connected through a resistor 69 and lead 70 to the counter 26a. The voltage drop through the resistor 69 provides sufficient bias to prevent a second thyratron from firing. Anode voltage for the thyratrons is supplied from the power supply of the electronic counter 26a through leads 28 and switch 27. One of the leads 28 of Figure I and the lead 34 are connected together through the counter 26, the lead 34 serving as the power lead to the solenoids 11-1 to 11-8. The rotary solenoids 11-1 to 11-8 are connected between the lead 34 and the plates 71-1 to 71-8 of the thyratrons. Each of the solenoid coils is by-passed by a resistor to minimize peak transient voltages.

The counter reset switch is also shown in Figure VI wherein the switch 24 is shown operated by the cam 18. It should be noted that switch 24 is timed to operate shortly after the switch 27.

It is a property of a thyratron tube that once plate current flow is started the grid of the tube loses control and the only way that the plate current may be interrupted is to reduce the plate voltage to zero or a negative voltage with respect to its cathode. However, as long as plate current is not flowing through the tube and the control grid is maintained sufficiently negative with respect to cathode the control grid can prevent the flow of plate current. This property is employed in the circuit shown in Figure VI in that if none of the thyratrons are conducting current there is no current flow through the resistor 69 and consequently the cathodes 67 are at the same potential as the return lead 70. As soon as a count is registered in the counter one of the leads 64 is driven positive with respect to the cathode lead 70 thus causing that thyratron to conduct current as long as the switch 27 remains closed. The flow of this current through the resistor 69 causes a voltage drop raising the potential of the cathode lead 68 so that enough grid bias is maintained on all of the thyratrons to prevent any change in state of any of the thyratrons regardless of changes in counter indication. When it is time to reset the thyratrons as at the point 62 of the timing diagram, the switch 27 is momentarily opened thus interrupting the flow of current through the conducting thyratron and resistor 69. This reduces the grid bias of the thyratrons so that, as soon as the switch 27 closes again and supplies power to the lead 34, that one of the thyratrons corresponding to the existing count in the counter, which has its grid positive with respect to the cathode lead 68 fires or conducts current. As soon as this current flow is established the counter may be reset by opening the switch momentarily without disturbing the thyratron selection.

The combination of a dynamic scale, electronic counter and a thyratron selecting circuit makes it possible to materially increase the operating speed of a weight classifying device particularly by allowing the loading and unloading parts of the cycle to occur simultaneously with the last part of the ordinary weighing cycle of the lever or scale. When ordinary weighing scales are employed, which must come to rest before a reading may be taken, no change in the loading of the scale may be made while the scale is assuming its balanced position and therefore a much longer period of time must be allotted to the weighing portion of the cycle.

While the timing diagram is arranged for maximum speed of operation it does not necessarily mean that the scale must be unloaded before it is locked. The only requirements are that the counter must be reset before or as the lever is released, that the lever must be locked before the thyratrons are reset, and that the weighed piece must pass the sorting gates before the thyratrons are reset for the next weighing. Thus the lever lock point 61 may be advanced ahead of the start of loading point 56 without interfering with the operation of the device.

Various modifications of the structure may be made and various subassemblies changed without departing from the scope of the invention.

Having described the invention, I claim:

1. In a device for classifying by weight, in combination, means for feeding objects, a movable load receiver, a motor driven conveyor mounted on the load receiver, and adapted to receive objects from the feeding means and carry them across the load receiver, a load counterbalancing spring operatively connected to the load receiver, a lever operatively connected to the load receiver and having means for generating a series of electrical impulses as the load receiver moves, an electronic counter for counting the number of impulses, means for holding the lever at one end of its range of travel, a motor for driving said feeding means, means operatively connected to said motor for resetting said counter and releasing the lever long enough for one oscillation of the load receiver and lever, take-away means for receiving objects from the conveyor, a plurality of sorting gates in said take-away means, and means operatively connected to said counter for selectively actuating said gates.

2. In a device for classifying objects by weight, in combination, a movable load receiver, a motor driven conveyor mounted on the load receiver, a load counterbalancing spring operatively attached to the load receiver, an indicator operatively connected to the load receiver, means for holding the load receiver and indicator at one end of their ranges of movement, a motor, means operatively connected to the motor for feeding objects onto the load receiver in timed sequence, means operatively connected to the motor for withdrawing the holding means in timed relation to the feeding means, a shutter carried on the indicator, a light source and photoelectric means cooperating with the shutter to generate a series of electrical impulses as the indicator moves, an electronic counter for counting the number of impulses, take-away means for receiving objects from the load receiver conveyor, a plurality of gates in said take-away means for separating the objects, and means operatively connected to the counter for operating that gate corresponding to a particular count in the counter.

3. In a device for classifying objects by weight, in combination, a movable load receiver, a load counterbalancing spring operatively connected to the load receiver, a continuously moving conveyor on the load receiver, an indicator operatively connected to the load receiver, a catch for holding the indicator and load receiver at one end of their ranges of travel, said spring being adapted to counterbalance a full capacity load with the indicator at rest at the middle of its range of travel, means cooperating with the indicator for generating a series of electrical impulses as the indicator moves, an electronic counter connected to said means for counting the impulses, a drive motor, means driven by the motor for feeding objects to the load receiver, means driven by the motor for withdrawing the catch for a predetermined time as each object crosses the load receiver, a plurality of gates selectively controlled by the counter, according to the number of impulses received and means for moving an object discharged from the load receiver through a selected gate.

4. A device according to claim 3, in which the means for moving a discharged object comprises a short wide belt, and said gates are arranged in two parallel lines one on either side of the undeflected path of an object discharged onto the belt.

5. A device according to claim 4 in which each gate comprises a resilient metal leaf adapted to resiliently yield as an object is deflected by the gate.

6. In a device for classifying objects by weight, in combination, a movable load receiver, a load counterbalancing spring operatively connected to the load receiver, a conveyor mounted on the load receiver and adapted to run at a constant speed, an indicator operatively connected to the load receiver, a catch adapted to hold the indicator at one end of its range of travel, said spring being adapted to counterbalance a full capacity load when said indicator is at rest in the middle of its range of travel, means cooperating with the indicator for generating a series of electrical impulses as the indicator swings, an approach conveyor for carrying objects to the scale, a motor for driving the approach conveyor, a plurality of cams driven by the motor, a switch operated by each cam, means controlled by one of said switches for withdrawing said catch, an electronic counter for counting the impulses, and take-away means for receiving objects from the load receiver conveyor, and means for selecting one of a plurality of discharge paths according to the count registered in the counter.

References Cited in the file of this patent

UNITED STATES PATENTS

| | | |
|---|---|---|
| 2,417,642 | Gilchrist et al. | Mar. 18, 1947 |
| 2,568,255 | Schieser et al. | Sept. 18, 1951 |